(12) United States Patent
Barnea et al.

(10) Patent No.: US 10,721,202 B2
(45) Date of Patent: Jul. 21, 2020

(54) BROADCAST RESPONSE PRIORITIZATION AND ENGAGEMENTS

(71) Applicant: International Business Machines Corporation, Armonk, NY (US)

(72) Inventors: Maya Barnea, Kiriat Bialik (IL); Shiri Kremer-Davidson, Yavniel (IL); Lior Leiba, Haifa (IL); Inbal Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 15/607,553

(22) Filed: May 29, 2017

(65) Prior Publication Data

US 2018/0343074 A1 Nov. 29, 2018

(51) Int. Cl.
*H04L 12/58* (2006.01)
*H04H 60/66* (2008.01)
(Continued)

(52) U.S. Cl.
CPC .............. *H04L 51/26* (2013.01); *H04L 51/02* (2013.01); *H04L 51/12* (2013.01); *H04L 51/32* (2013.01); *G06Q 10/107* (2013.01); *G06Q 50/01* (2013.01); *H04H 60/33* (2013.01); *H04H 60/66* (2013.01); *H04L 51/22* (2013.01)

(58) Field of Classification Search
CPC .... G06Q 10/107; G06Q 10/109; G06Q 10/10; G06Q 50/01; H04L 51/00; H04L 51/02; H04L 51/10; H04L 51/12; H04L 51/22; H04L 51/26; H04L 51/32; H04L 51/34
See application file for complete search history.

(56) References Cited

U.S. PATENT DOCUMENTS

| 6,044,146 A * | 3/2000 | Gisby | H04L 29/06 379/266.02 |
| 6,424,997 B1 * | 7/2002 | Buskirk, Jr. | G06Q 10/107 709/201 |

(Continued)

OTHER PUBLICATIONS

Ayodele et al. "Email reply prediction: a machine learning approach." Symposium on Human Interface, 2009, pp. 114-123 (Year: 2009).*

(Continued)

*Primary Examiner* — Vivek Srivastava
*Assistant Examiner* — William C McBeth
(74) *Attorney, Agent, or Firm* — Dvir Gassner

(57) ABSTRACT

A computerized method comprising using at least one hardware processor for receiving a plurality of digital responses in response to a digital broadcast, each digital response associated with at least one of a plurality of computerized devices. The method comprises an action of calculating a plurality of priority scores, one each for some of the plurality of digital responses, and an action of selecting an ordered subset of the plurality of digital responses based on the plurality of priority scores. The method comprises an action of presenting to a user the ordered subset, and an action of receiving at least one digital counter-response for at least one of the plurality of digital response. The method comprises an action of sending the at least one digital counter-response to a respective one of the plurality of computerized devices associated with the respective digital response.

20 Claims, 2 Drawing Sheets

(51) Int. Cl.
  *H04H 60/33* (2008.01)
  *G06Q 50/00* (2012.01)
  *G06Q 10/10* (2012.01)

(56) References Cited

U.S. PATENT DOCUMENTS

| | | | | |
|---|---|---|---|---|
| 6,956,941 | B1* | 10/2005 | Duncan | H04L 51/26 379/265.01 |
| 8,032,602 | B2* | 10/2011 | Lavoie | H04L 51/26 709/206 |
| 8,095,613 | B1* | 1/2012 | Perkowitz | G06Q 10/109 709/207 |
| 8,745,161 | B2 | 6/2014 | Darnell et al. | |
| 9,088,620 | B2 | 7/2015 | Balakrishnan | |
| 9,824,321 | B2* | 11/2017 | Raghunathan | H04L 51/32 |
| 2003/0018724 | A1* | 1/2003 | Mathewson, II | G06Q 10/107 709/206 |
| 2004/0039786 | A1* | 2/2004 | Horvitz | G06Q 10/107 709/207 |
| 2006/0010217 | A1* | 1/2006 | Sood | H04L 51/12 709/206 |
| 2008/0005249 | A1* | 1/2008 | Hart | G06Q 10/107 709/206 |
| 2009/0030932 | A1 | 1/2009 | Harik et al. | |
| 2010/0042570 | A1* | 2/2010 | Mayers | H04L 51/00 706/46 |
| 2010/0246797 | A1* | 9/2010 | Chavez | G06Q 10/10 379/265.02 |
| 2011/0288897 | A1* | 11/2011 | Erhart | G06Q 50/01 705/7.13 |
| 2012/0272160 | A1* | 10/2012 | Spivack | G06Q 10/10 715/752 |
| 2013/0198652 | A1 | 8/2013 | Dunn et al. | |
| 2013/0212047 | A1* | 8/2013 | Lai | G06Q 10/107 706/12 |
| 2013/0317808 | A1* | 11/2013 | Kruel | H04L 51/32 704/9 |
| 2014/0025688 | A1 | 1/2014 | Andler et al. | |
| 2014/0280236 | A1* | 9/2014 | Faller | H04L 51/32 707/749 |
| 2016/0004761 | A1 | 1/2016 | Zhang et al. | |
| 2016/0055250 | A1* | 2/2016 | Rush | G06Q 50/01 707/733 |
| 2016/0182420 | A1* | 6/2016 | Shen | H04L 51/26 709/206 |
| 2016/0212071 | A1* | 7/2016 | Hannah | H04L 51/32 |
| 2016/0226811 | A1* | 8/2016 | Kerschhofer | H04L 51/26 |
| 2016/0255034 | A1* | 9/2016 | Yuan | H04L 51/32 709/206 |
| 2016/0299965 | A1* | 10/2016 | Starr | G06F 16/9535 |
| 2016/0301650 | A1* | 10/2016 | Oztaskent | H04L 51/26 |
| 2017/0034103 | A1* | 2/2017 | Karuppasamy | G06F 16/24578 |
| 2017/0169029 | A1* | 6/2017 | Song | G06F 16/24578 |
| 2017/0272550 | A1* | 9/2017 | Rodriguez | G06Q 10/10 |
| 2017/0302613 | A1* | 10/2017 | Imbrie | H04L 51/26 |
| 2018/0033019 | A1* | 2/2018 | Mora | G06Q 30/016 |
| 2018/0176380 | A1* | 6/2018 | McCoy | H04L 51/32 |
| 2018/0191644 | A1* | 7/2018 | Campos | H04L 51/02 |
| 2018/0219817 | A1* | 8/2018 | Zang | H04L 51/26 |
| 2018/0253659 | A1* | 9/2018 | Lee | H04L 51/26 |
| 2018/0293278 | A1* | 10/2018 | Kapoor | H04L 51/32 |
| 2018/0367480 | A1* | 12/2018 | Housman | H04L 51/04 |

OTHER PUBLICATIONS

Dredze et al. "Intelligent email: reply and attachment prediction." Proceedings of the 13th International Conference on Intelligent User Interfaces. 2008, pp. 321-324 (Year: 2008).*

* cited by examiner

BROADCAST RESPONSE PRIORITIZATION AND ENGAGEMENTS

BACKGROUND

The invention relates to the field of operational resource management.

In many industrial and computerized systems, broadcast-response networks are used to communicate information between nodes or devices of the network, such as between a central device and peripheral devices. One node may broadcast an electronic communication, and receive from at least some of the other nodes a response. As a result of the response, the broadcaster may issue a counter-response, such as sending a maintenance crew to repair a faulty sensor, sending requested data, sending an acknowledgment, replying to an email, and the like For example, maintenance tasks are collected during the day in a factory, and at night a maintenance manager will review the tasks, prioritize based on the resources, and dispatch maintenance personnel to perform the tasks based on the prioritization. This example may be performed using a push (peripheral device initiated) or pull (central broadcaster initiated) technique. For example, a manager may broadcast a message to the factory workers to report maintenance needs, and receive response form the factory workers.

For example, a politician receives a large number of emails every day, optionally in response to a news article, a blog post, or the like, and assigns assistants to send email replies. For example, a user sends a post to a social network, receives a large number of responses, such as comments and/or reactions, to the post, and sends a counter-response to some of the responses, such as comments and/or reactions.

For example, a vehicle central processor sends a broadcast for information from peripheral devices of the vehicle using the controller area network bus (CAN-bus), and the peripheral devices (such as electronic control units—ECUs) send the information periodically until an acknowledgement is received.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a computerized method comprising using at least one hardware processor for receiving a plurality of digital responses in response to a digital broadcast, each digital response associated with at least one of a plurality of computerized devices. The method comprises an action of calculating a plurality of priority scores, one each for some of the plurality of digital responses. The method comprises an action of selecting an ordered subset of the plurality of digital responses based on the plurality of priority scores, where the ordering is associated with the urgency of providing a counter-response according to the respective priority score. The method comprises an action of presenting to a user, using a user interface, the ordered subset. The method comprises an action of receiving at least one digital counter-response, from the user using the user interface, for at least one of the plurality of digital response. The method comprises an action of sending the at least one digital counter-response to a respective one of the plurality of computerized devices associated with the respective digital response.

In some embodiments, the method further comprises an action of emitting a digital broadcast to the plurality of computerized devices.

In some embodiments, the method further comprises an action of receiving a plurality of profiles each associated with at least one of the plurality of computerized devices.

In some embodiments, the calculating is based on previous counter-responses and outcomes using at least one of a statistical analysis, machine learning analysis, a heuristic analysis, a Monte-Carlo analysis, and a Bayesian analysis.

In some embodiments, the calculating is based on at least one of a time stamp of the broadcast, a time stamp of the response, and a current time.

In some embodiments, the method further comprises an action of generating a suggested counter-response, wherein the suggested counter-response is based on previous counter-responses and outcomes, and wherein at least one of the presenting, receiving, and sending the digital counter-response includes the suggested counter-response.

In some embodiments, the suggested counter-response is automatically sent to the at least one of the plurality of computerized devices associated with the at least one of the plurality of digital reactions.

In some embodiments, the method is implemented as a system, a computer program product, and/or the like.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
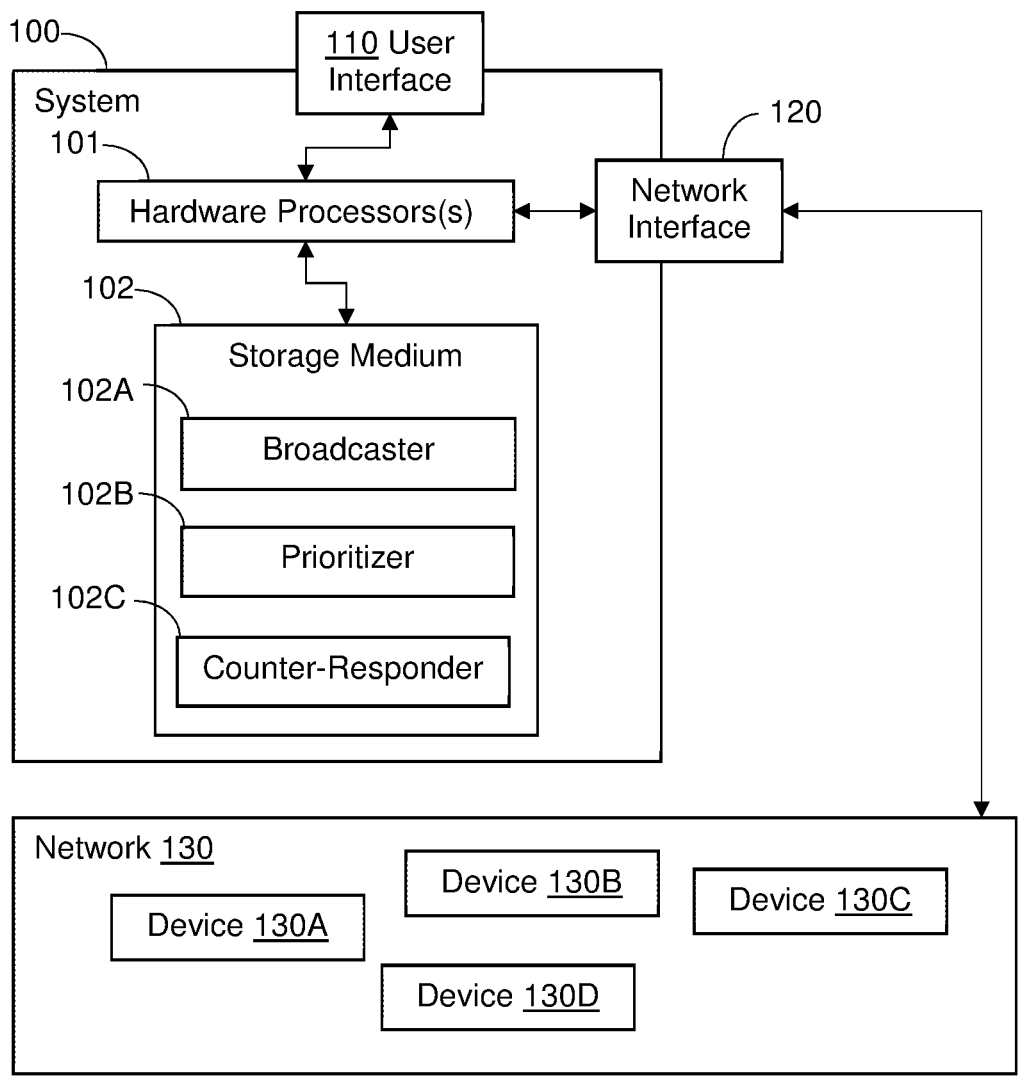
FIG. 1 shows schematically a system for prioritizing responses and sending counter-responses.

Described herein are systems, methods, and computer program products for prioritizing operational resource management. According to some embodiments, a list of digital responses is received at a central server using either a push or pull technique. A pull technique may be used by broadcasting a digital message to initiate responses from other devices of the system or network. The list of responses may be prioritized automatically by the server to determine the urgency and relevancy of the counter-responses. The prioritizing may be based on an analysis of previous broadcasts, responses, counter-responses, and a desired outcome that is the goal of the broadcast and/or counter-response. A subset of the prioritized responses may be selected for presentation to a user, optionally with a suggested counter-response. The user may select the suggested counter-response, manually enter a counter-response, select a counter-response from a list, or the like. Once selected, the counter-response may be sent to the device that sent the response, or the counter-response may be broadcasted as a new digital message.

Optionally, the analysis of previous broadcasts is one of a statistical analysis, a machine learning analysis, a heuristic analysis, a Monte-Carlo analysis, a Bayesian analysis or the like.

Optionally, the network is an industrial network of devices in a factory, a plant, a processing facility, a sorting facility, an industrial multi-center company, a wide area network, and/or the like.

Optionally, the network is a computer network, a world-wide-web network, a social network, a professional network, a virtual network, a vehicle network, an electronic mail network, and/or the like. For example, a cruise ship has a CAN-bus network for controlling the operation of the ship, and a central controller uses aspects of some embodiments to prioritize responses and send counter-responses. For example, the network is a social network, such as Facebook®, Twitter®, Instagram®, and/or the like, and a broadcast is performed with a broadcasting user port to the central server from where the post is distributed to multiple client terminals for presentation to responding users on user interfaces. When the responding users submits a response, such as an electronic comment, a reaction, a share, and/or the like, on the user interface, the broadcasting user may use the prioritization technique to select a subset of responses that may need a counter-response to achieve the goal of the initial broadcast.

Some of the examples will describe aspects of embodiments on a social network, but the aspects are relevant with minor modifications to industrial applications, electronic messaging systems, vehicle applications, or the like. The use of examples on social networks is not intended as limiting, but as a specific example of possible application in other fields.

The prioritizing may be based on an analysis of similar broadcasts, responses, counter-responses, goals, and/or the like, previously performed. For example, a statistical analysis of the maintenance of a factory is done on historical maintenance data, and similarities found to the current broadcast goals, such as minimum factory down time, minimum maintenance costs, maximum productivity, and/or the like. For example, a machine learning analysis is done on a large database of voter responses, counter-responses, goals, such as maximum number of election votes, maximum re-election probability, and/or the like. The machine learning analysis may be based on the election results of multiple politicians across multiple regions, and therefore include a large amount of data.

The prioritization technique is important in these systems when the amount of responses is larger than the resource capacity of the production of counter-responses, thus creating a backlog of responses needing a counter-response. Some response may not receive a counter-response in these cases, and the broadcast user may benefit from prioritizing the responses to increase operational efficiency towards achieving the desired goals, outcomes, and/or the like.

For example, a system follows a broadcasting user's posted contents and identifies other user's interactions and/or responses to the posted contents, such as comments, reactions, and/or the like. The system may compute a score for each response, such as based on goals, engagement opportunities, the responding user profile and/or identity, time of response, and/or the like. The default counter-responses for each response may be additionally computed. The responses may be displayed in descending score order to the broadcasting user. Optionally, the primary influencing input values to the score are displayed to the user for each response. The user may send a counter-response to some responses, such as the default counter-response, a manually inputted counter-response, a counter-response selected from a list of optional responses, and/or the like. Optionally, the system records the selected counter-response for use in future responses, such as scoring of future responses, future default counter-responses, future counter-responses options, and/or the like.

Currently systems support mostly manual inspection of posted content and responses in chronological order, and when the number of responses exceeds the resources available to counter-respond, a backlog of responses will be created. Being able to automatically identify and/or prioritize a subset of important responses (e.g. in a time frame) allows a broadcasting user to counter respond to the important responses and ignore the unimportant ones, according to the goals of the broadcast. When large numbers of responses are received, the automatic prioritizing technique avoids manually evaluating each response and manually entering a counter-response for each. This allows the broadcasting user to focus, save time, and reduce the chances of missing an important counter-response opportunity, such as avoid missing engagements. The automatic computing of a score may be based on the goal of the broadcasting user, such as topics of interest, motivation, receive more feedback, operational needs, business needs, and/or the like. The prioritization of responses may locate and present to a broadcasting user the important responses that were previously missed, such as important responses that do not have a counter-response.

The prioritized responses may be automatically presented to users using an alerting system, a server, a notification system, a user interface, a streaming filter of responses, and/or the like.

Reference is now made to FIG. 1, which shows schematically a system 100 for prioritizing responses and sending counter-responses. System 100 includes one or more hardware processors 101, a non-transitory computer readable storage medium 102 (herein "storage medium"), a user interface 110, and/or a network interface 120. Storage medium comprises modules of program code configured to adapt the computerized system to perform actions, such as with processor instructions. A Broadcaster 102A module comprising program code configured to cause the hardware processor(s) to optionally broadcast a digital broadcast, such as an email, a computer bus command, a post, a blog article, an electronic document, and/or the like. The Broadcaster 102A module comprises program code for receiving responses from multiple devices, such as 130A, 130B, 130C, 130D, and/or the like, on a network 130. A Prioritizer 102B program code computes for each response a priority score based on existing data, such as a learned history of counter-responses, one or more predefined goals, user profiles, broadcaster profiles, and/or the like. Prioritizer 102B program code transfers responses and priority scores to a Counter-Responder 102C module for sending a counter-response to the devices associated with some of the responses, such as automatically selecting a counter-response, presenting a default counter-response to a user using user interface 110, receiving a manual counter-response from a user using user interface 110, and/or the like.

Figure 2:
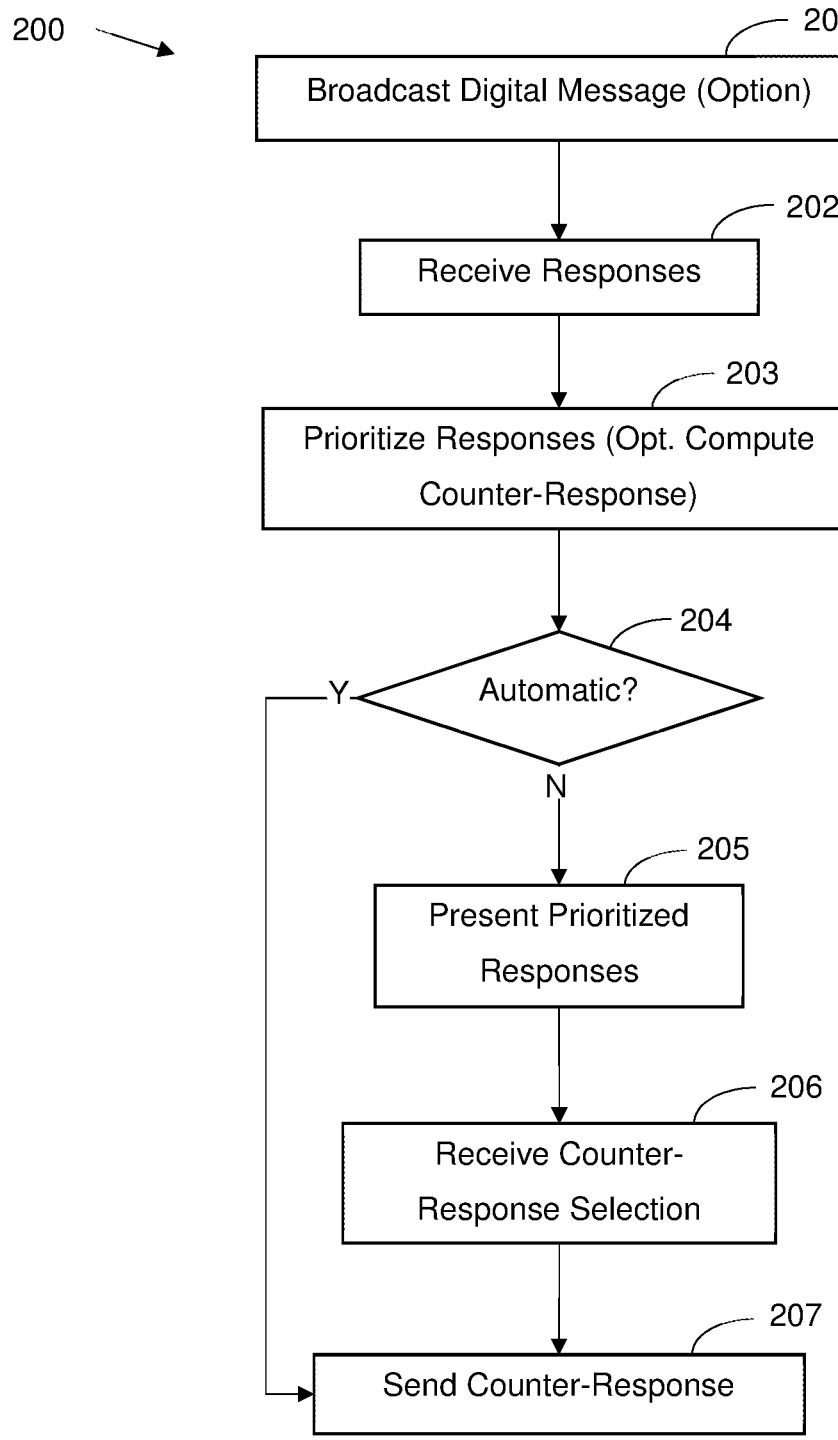
FIG. 2 shows a flowchart for prioritizing responses and sending counter-responses.

Reference is now made to FIG. 2, which shows a flowchart 200 of a method for prioritizing responses and sending counter-responses. Optionally, a digital message is broadcasted 201, such as a bus device command, a peripheral device command over a digital network connection, a social media post, a blog content, a media post, and/or the like.

Optionally, the broadcast is performed by a third party, such as a newspaper article, a press release, a television news item, and/or the like. Multiple responses may be received 202 in response to the broadcasted 201 digital message(s). The responses are prioritized 203 by computing a priority score. The priority score is based on the goal of the broadcast or other goals associated with the broadcast, such as maintenance efficiency, low maintenance costs, sales, public relations (i.e. when a negative news item is viewed by millions of people and they send digital response to their political representative), and/or the like. Optionally, a counter-response is also computed based on an analysis of historical data, user preferences, learned responses, and/or the like. When the counter-response is not sent 206 automatically 204, at least some of the responses are presented 205 to a user on a user interface in descending order. On the user interface the user may select 206 a default counter-response, manually enter a counter-response, select from a list of counter-responses, and/or the like. The selection is received 206 by the hardware processor(s), and sent 207 to the devices associated with the responses for presentation to the responding user on a user interface of the devices.

An example algorithm for prioritization of responses and sending counter-responses is:
i) Extract broadcasted posts that were responded to, such as in a predefined time frame. This extraction may include shares of the user's contribution by others. Optionally, the time of the broadcast is outside the time frame but the response is inside the time frame.
ii) For each broadcast, compute the number of textual responses (e.g. Comments) other posted on it, the number of reactions posted on it (such as a like), the ratio between the number of counter-responses the broadcasting user placed on the post compared to the number of responses other users placed on the post.
iii) Compute the broadcasting user's average counter-response ratio rate and average ratio of broadcasting peer users with similar amounts of posts, responses and counter-responses.
iv) Order the broadcasting user's posts based on stratification of the ratio value, and then within each stratified ratio by the creation date of the post (e.g. from most recent to oldest).
v) Define a subset of the posts using a static threshold and/or using a function to determine the threshold, such as:
  (a) When a user average ratio is less than similar the ratio of peers, then include posts with ratio equal or higher than the user average ratio.
  (b) When a user average ratio greater than or equal to the ratio of peers then include posts with ratio equal or higher than the ratio of peers.

As used herein, a missed opportunity is defined as an electronic broadcast (such as a message, a post, or the like) that initiated a response and when a counter-response was not sent by the broadcasting user. Some missed opportunities may be best matched with a textual counter-response from the broadcasting user, such as a comment, some may be best matched with a reaction counter-response, such as a "like", and others may be best suited for no counter-response. The system evaluates each opportunity and computes a score its potential opportunity for the broadcasting user's goals in a personalized manner.

For example, in a system for monitoring posts and responses in a politicians account of a social network may include a:

User profile: keeps track of what is important to the user (i.e. goal) to counter-responding to, based on the broadcasting user's explicit/implicit input.
Social Network Activity collector: stores responses to posted contents (e.g. In a social graph).
Extensible opportunity score algorithm library: that has alternative algorithms to compute scores.
Opportunity Interaction learner: that learns and/or analyzes goals based on the broadcasting user's interactions to responses, such as what/who is most important to the broadcasting user.
Missed opportunities collector: identifies missed opportunities, activate other parts to calculate their importance score (taking into account their learned user preferences), sort opportunities based on score, extract evidence as to why the system finds this important and how it recommends to interact.
User Interface: to communicate opportunities with the user Following are some examples use cases of important missed opportunities:
A target future customer posted a response to a broadcast, such as a blog entry, and did not receive a counter-response.
A user broadcasts a status update (such as on a microblog) with a question to a colleague, the colleague sent a response but the broadcasting user did not send a counter-response.
Thirty people commented on a question broadcasted by a user, but the broadcasting user did not see the comments and you should probably put attention to some of the responses.

The system may prioritize some of the responses to assist the broadcasting user in sending counter-responses.

Though some of the examples are based on social networks, the techniques described may be used for other applications that may benefit from automatic prioritization of responses to determine the highest priority counter-responses to send. For example, social media are computer network technologies that allow creation and sharing of information, such as user-generated digital content. User-generated content (UGC) may be an electronic document, a digital image, a test message, an emoji, and/or the like. Social media differ from printed media (e.g., magazines, newspapers, etc.) or electronic media (e.g. TV broadcasting, radio, etc.) in many ways, including quality, reach, frequency, usability, immediacy, permanence, and/or the like. Social media websites include Baidu Tieba, Facebook (and its associated Facebook Messenger), Gab, Google+, Instagram, LinkedIn, Pinterest, Reddit, Snapchat, Tumblr, Twitter, Viber, WeChat, Weibo, WhatsApp, YouTube, etc.

For example, users are contributing more and more content, such as posts, in social network applications. Contributed content frequently receives responses, such as reactions, likes, comments, shares, and/or the like, from other users. The more content a user posts the more difficult it may be to monitor other user's responses and verify that the user of the original post has read and counter-responded (when needed) to the responses, thereby engaging the users who took time to respond to the original post. In some cases, a user may post hundreds of original posts in a short time, such as an hour, a day, or the like. The original posts may each generate tens of responses resulting in thousands of responses that need to be monitored and possibly counter-responded to.

For example, when a user is running a campaign on social media, and the campaign involves multiple social networks (i.e. Facebook, Instagram, Twitter, LinkedIn, or the like), the numbers of counter-responses needed may by significant, such as hundreds per day, thousands per day, tens of thousands per day, or the like.

Optionally, user of importance or interest to the broadcasting are identified by mining the user's social network and other users interacted with in the past, such as by extraction of related users to the broadcasting user based on the number of comments, number of likes, number of reactions, number of tags, and the like. Optionally, users who are expert in a specific field are identified based on their activity, such as comments, posts, reaction, and/or the like, in social networks. An algorithm may identify for each field a weighted list of experts. For example, given a field and a person, searching whether the person appears in the list of experts for that field may determine the person's expertise level in the field.

Optionally, an influence score quantifies a user's eminence in the social network. Eminence score reflects how other users perceive the broadcasting user. For example, an eminence score is based on the number of other users trying to interact or share information with the user, follow the user, and/or the like. The influence score computation may be based on a social graph containing all activities in the social network and may be computed as a weighted sum of a set of counter values over the graph.

Learning another user's topics of interest can be performed in two tasks:

Extracting the topic of each broadcast the other user acted
  upon (such as a blog where the user wrote a web-page she vised in or a post she liked)
Constructing, based on the topics, the user's ranked list of
  topics of interest and monitoring the topic list over time For example, extracting topics may be performed by the Latent Dirichlet Allocation (LDA) algorithm, such as using open source libraries (i.e. Mallet). Optionally, analysis is adapted for each data source, such as the topic of a comment (or a reaction) may take into account the topic of the post. For example, a document of a chat may be constructed as a cleansed aggregation of messages (such as per user or according to time) and only then be analyzed by LDA.

Constructing the user's list of topics of interests may be done by adding the following aspects:

Ranking the topic's importance as a weighted sum of the
  content items the user acted upon—i.e., giving higher importance weight to topic that user wrote upon than topic the user liked . . . than topic the user viewed).
Add a time decay factor that prioritize new topics over
  older one.
Combining related topics (to avoid topic "inflation")
  using synonym engines or external data sources (such as Wikipedia). E.g., we can understand from Wikipedia 'Options' term that the keywords: short, put, call and option may be all part of the same topic.

Inputs to the computation of priority scores may include:
a) topics of interests of other users,
b) defined topics of interests of the broadcasting user,
c) learned topics of interests of the broadcasting user,
d) number of other user responses,
e) number of other user reactions,
f) number of the broadcasting user comments,
g) the other users social network influence score,
h) the other user's role in organization,
i) explicitly defined important other user,
j) learned importance of other user to the broadcasting user,
k) other user's expertise,
l) other user's defined topics of interest,
m) other user's learned topics of interest,
n) other user's number of times broadcast presented,
o) broadcasting user past counter-responses to other users, and
p) broadcasting user marked another user as not relevant.

Following are intermediate scores computed from the inputs. Inputs a, b, and c may determine topics of interest (TOI) and TOI list similarity. Inputs d, e, and f may determine quality of missed engagement by a normalized ratio between broadcast user activity and the activity of peers. Inputs g thru m may determine contributor importance by a weighted sum over the set of some inputs. Inputs n, o, and p may determine opportunity interaction history by a weighted sum over the set of some inputs.

The computed intermediate scores may range in values from 0 to 1 and may be stratified as not relevant (values=0), slightly relevant (values in the range 0 to 0.2), borderline relevant (values in the range 0.2 to 0.4), somewhat relevant (values in the range 0.4 to 0.6), relevant (values in the range 0.6 to 0.8), and highly relevant (values in the range 0.8 to 1).

An interest alignment score may be computed using the equation:

$$oppotunity\ score = \sum_{J=1}^{n}(IAA_J(x) * WJ * FJ)$$

where $IAA_J$ denote each of the intermediate scores, WJ denotes a weighting factor for each intermediate score, and FJ denotes a user specified importance factor for each intermediate score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method comprising using at least one hardware processor for:
   receiving, from a broadcaster, one or more predefined goals of a digital broadcast made by the broadcaster in a social network;
   receiving a plurality of digital responses in response to the digital broadcast, each digital response associated with at least one of a plurality of social network users;
   calculating a plurality of priority scores, one each for some of the plurality of digital responses, wherein the calculating is based on the following factors:
      previous counter-responses,
      the one or more predefined goals,
      topics of interest of the broadcaster in the social network,
      topics of interest of the plurality of social network users in the social network,
      similarity of the topics of interest of the broadcaster to the topics of interest of the plurality of social network users,
      a normalized ratio between activity of the broadcaster in the social network and activity of the plurality of social network users in the social network,
      an importance of the broadcaster in the social network, and
      an importance of each of the plurality of social network users in the social network, wherein the calculating uses at least one of: a machine learning analysis, a Monte-Carlo analysis, and a Bayesian analysis;
  selecting an ordered subset of the plurality of digital responses based on the plurality of priority scores, where the ordering is associated with an urgency of providing a counter-response according to the respective priority score;
  presenting to a user, using a user interface, the ordered subset;
  receiving at least one digital counter-response, from the user using the user interface, for at least one of the plurality of digital responses; and
  sending the at least one digital counter-response to a respective one of the plurality of computerized devices associated with the at least one of the plurality of digital responses.

2. The method according to claim 1, further comprising emitting a digital broadcast to the plurality of computerized devices.

3. The method according to claim 1, further comprising receiving a plurality of profiles each associated with at least one of the plurality of computerized devices.

4. The method according to claim 1, wherein the calculating is based on at least one of a time stamp of the broadcast, a time stamp of the response, and a current time.

5. The method according to claim 1, further comprising generating a suggested counter-response, wherein the suggested counter-response is based on previous counter-responses and outcomes, and wherein at least one of the presenting, receiving, and sending the at least one digital counter-response includes the suggested counter-response.

6. The method according to claim 5, wherein the suggested counter-response is automatically sent to the respective one of the plurality of computerized devices.

7. The method according to claim 1, wherein:
  a list of the topics of interest of the broadcaster is constructed by (a) ranking an importance of each of the topics of interest of the broadcaster according to how the broadcaster has acted upon the respective topic of interest in the social network, and (b) using a time decay factor to prioritize newer ones of the topics of interest of the broadcaster over older ones of the topics of interest of the broadcaster;
  the topics of interest of the plurality of social network users are extracted by a latent Dirichlet allocation (LDA) algorithm from comments of the plurality of social network users in the social network;
  the importance of the broadcaster is computed by analyzing a social graph containing activities in the social network, to determine an amount of social network users who interact with the broadcaster in the social network; and
  the calculating comprises:
    computing intermediate scores for at least some of the factors,
    weighting the intermediate scores according to predefined weighting factors, and
    further weighting the intermediate scores according to importance factors specified by the broadcaster.

8. A system comprising:
  at least one hardware processor;
  a network interface;
  a non-transitory computer-readable storage medium having program code embodied therewith, the program code executable by the at least one hardware processor to:
    receive, from a broadcaster, one or more predefined goals of a digital broadcast made by the broadcaster in a social network;
    receive, using the network interface, a plurality of digital responses in response to the digital broadcast, each digital response associated with at least one of a plurality of social network users;
    calculate a plurality of priority scores, one each for some of the plurality of digital responses, wherein the calculating is based on the following factors:
      previous counter-responses,
      the one or more predefined goals,
      topics of interest of the broadcaster in the social network,
      topics of interest of the plurality of social network users in the social network,
      similarity of the topics of interest of the broadcaster to the topics of interest of the plurality of social network users,
      a normalized ratio between activity of the broadcaster in the social network and activity of the plurality of social network users in the social network,
      an importance of the broadcaster in the social network, and
      an importance of each of the plurality of social network users in the social network,
    wherein the calculating uses at least one of: a machine learning analysis, a Monte-Carlo analysis, and a Bayesian analysis;
    select an ordered subset of the plurality of digital responses based on the plurality of priority scores, where the ordering is associated with an urgency of providing a counter-response according to the respective priority score;
    present to a user, using a user interface, the ordered subset;
    receive at least one digital counter-response, from the user using the user interface, for at least one of the plurality of digital responses; and
    send the at least one digital counter-response to a respective one of the plurality of computerized devices associated with the at least one of the plurality of digital responses.

9. The system according to claim 8, wherein the program code is further executable to emit a digital broadcast to the plurality of computerized devices.

10. The system according to claim 8, wherein the program code is further executable to receive a plurality of profiles each associated with at least one of the plurality of computerized devices.

11. The system according to claim 8, wherein the calculating is based on at least one of a time stamp of the broadcast, a time stamp of the response, and a current time.

12. The system according to claim 8, wherein the program code is further executable to generate a suggested counter-response, wherein the suggested counter-response is based on previous counter-responses and outcomes, and wherein at least one of the presenting, receiving, and sending the at least one digital counter-response includes the suggested counter-response.

13. The system according to claim 12, wherein the suggested counter-response is automatically sent to the respective one of the plurality of computerized devices.

14. The system according to claim 8, wherein:
  a list of the topics of interest of the broadcaster is constructed by (a) ranking an importance of each of the topics of interest of the broadcaster according to how the broadcaster has acted upon the respective topic of interest in the social network, and (b) using a time decay factor to prioritize newer ones of the topics of interest of the broadcaster over older ones of the topics of interest of the broadcaster;

the topics of interest of the plurality of social network users are extracted by a latent Dirichlet allocation (LDA) algorithm from comments of the plurality of social network users in the social network;

the importance of the broadcaster is computed by analyzing a social graph containing activities in the social network, to determine an amount of social network users who interact with the broadcaster in the social network; and the calculating comprises:
  computing intermediate scores for at least some of the factors,
  weighting the intermediate scores according to predefined weighting factors, and
  further weighting the intermediate scores according to importance factors specified by the broadcaster.

15. A computer program product for prioritizing responses, the computer program product comprising a non-transitory computer-readable storage medium having program code embodied therewith, the program code executable by at least one hardware processor to:
  receive, from a broadcaster, one or more predefined goals of a digital broadcast made by the broadcaster in a social network;
  receive, using a network interface, a plurality of digital responses in response to the digital broadcast, each digital response associated with at least one of a plurality of social network users;
  calculate a plurality of priority scores, one each for some of the plurality of digital responses, wherein the calculating is based on the following factors:
    previous counter-responses,
    the one or more predefined goals,
    topics of interest of the broadcaster in the social network,
    topics of interest of the plurality of social network users in the social network,
    similarity of the topics of interest of the broadcaster to the topics of interest of the plurality of social network users,
    a normalized ratio between activity of the broadcaster in the social network and activity of the plurality of social network users in the social network,
    an importance of the broadcaster in the social network, and
    an importance of each of the plurality of social network users in the social network,
  wherein the calculating uses at least one of: a machine learning analysis, a Monte-Carlo analysis, and a Bayesian analysis;
  select an ordered subset of the plurality of digital responses based on the plurality of priority scores, where the ordering is associated with an urgency of providing a counter-response according to the respective priority score;
  present to a user, using a user interface, the ordered subset;
  receive at least one digital counter-response, from the user using the user interface, for at least one of the plurality of digital responses; and
  send the at least one digital counter-response to a respective one of the plurality of computerized devices associated with the at least one of the plurality of digital responses.

16. The computer program product according to claim 15, wherein the program code is further executable to emit a digital broadcast to the plurality of computerized devices.

17. The computer program product according to claim 15, wherein the program code is further executable to receive a plurality of profiles each associated with at least one of the plurality of computerized devices.

18. The computer program product according to claim 15, wherein the calculating is based on at least one of a time stamp of the broadcast, a time stamp of the response, and a current time.

19. The computer program product according to claim 15, wherein the program code is further executable to generate a suggested counter-response, wherein the suggested counter-response is based on previous counter-responses and outcomes, and wherein at least one of the presenting, receiving, and sending the at least one digital counter-response includes the suggested counter-response.

20. The computer program product according to claim 15, wherein:
  a list of the topics of interest of the broadcaster is constructed by (a) ranking an importance of each of the topics of interest of the broadcaster according to how the broadcaster has acted upon the respective topic of interest in the social network, and (b) using a time decay factor to prioritize newer ones of the topics of interest of the broadcaster over older ones of the topics of interest of the broadcaster;
  the topics of interest of the plurality of social network users are extracted by a latent Dirichlet allocation (LDA) algorithm from comments of the plurality of social network users in the social network;
  the importance of the broadcaster is computed by analyzing a social graph containing activities in the social network, to determine an amount of social network users who interact with the broadcaster in the social network; and
  the calculating comprises:
    computing intermediate scores for at least some of the factors,
    weighting the intermediate scores according to predefined weighting factors, and
    further weighting the intermediate scores according to importance factors specified by the broadcaster.

* * * * *